US012634421B1

(12) United States Patent
Jawahar

(10) Patent No.: US 12,634,421 B1
(45) Date of Patent: May 19, 2026

(54) IMMERSIVE STEREOVISION SYSTEM USING CONVERGED CAMERAS

(71) Applicant: E-CON SYSTEMS INDIA PRIVATE LIMITED., Chennai (IN)

(72) Inventor: T Jawahar, Chennai (IN)

(73) Assignee: E-CON SYSTEMS INDIA PRIVATE LIMITED., Chennai (IN)

( * ) Notice: Subject to any disclaimer, the term of this patent is extended or adjusted under 35 U.S.C. 154(b) by 0 days.

(21) Appl. No.: 19/073,512

(22) Filed: Mar. 7, 2025

(51) Int. Cl.
| | |
|---|---|
| *H04N 13/122* | (2018.01) |
| *H04N 13/00* | (2018.01) |
| *H04N 13/239* | (2018.01) |
| *H04N 23/69* | (2023.01) |

(52) U.S. Cl.
CPC ......... *H04N 13/122* (2018.05); *H04N 13/239* (2018.05); *H04N 23/69* (2023.01); *H04N 2013/0081* (2013.01)

(58) Field of Classification Search
CPC .... H04N 13/122; H04N 13/239; H04N 23/69; H04N 2013/0081
See application file for complete search history.

(56) References Cited

U.S. PATENT DOCUMENTS

| | | | | |
|---|---|---|---|---|
| 12,143,618 B2 * | 11/2024 | Raju | .................. | H04N 19/46 |
| 2012/0229595 A1 * | 9/2012 | Miller | ................ | H04N 13/167 |
| | | | | 348/43 |
| 2013/0010069 A1 * | 1/2013 | Raju | .................. | H04N 19/70 |
| | | | | 348/42 |
| 2013/0011047 A1 * | 1/2013 | Kwon | ................ | G06V 20/49 |
| | | | | 382/154 |

* cited by examiner

*Primary Examiner* — Jae N Noh
(74) *Attorney, Agent, or Firm* — Sage Patent Group

(57) ABSTRACT

A system and method for creating stereoscopic (3D) vision includes a first image sensor and a second image sensor with an adjustable focal length to capture a first image and a second image of an object from different perspectives. These image sensors are positioned in the same plane and angled inward, so their optical axes converge at a point. A processor connected to these sensors dynamically calculates a distance between the object and the image sensors as and when the focal length is changed. The processor processes the captured images and dynamically shifts one of the images relative to the other based on the object's position with respect to the convergence point. The processor identifies a fixed Region of Interest (ROI) and crops the ROI from the shifted image to create a stereoscopic (3D) vision independent of the focal length adjustment.

13 Claims, 6 Drawing Sheets

304

305

IMMERSIVE STEREOVISION SYSTEM USING CONVERGED CAMERAS

FIELD OF THE INVENTION

The present invention pertains to the field of stereoscopic imaging and visualization technology. More particularly, it involves the creation and manipulation of stereoscopic (3D) vision using converged stereo cameras equipped with optical zoom lenses.

BACKGROUND OF THE INVENTION

The following description of related art is intended to provide background information pertaining to the field of the present disclosure. This section may include certain aspects of art that may be related to various aspects of the present disclosure. However, it should be appreciated that this section be used only to enhance the understanding of the reader with respect to the present disclosure, and therefore, unless otherwise indicated, it should not be assumed that any of the approaches described in this section qualify as prior art merely by virtue of their inclusion in this section.

In stereoscopic imaging, two images are captured from slightly different perspectives to mimic how human eyes perceive depth. These images are then combined to create a stereoscopic effect when viewed using suitable display systems. Traditional stereo camera setups often encounter challenges when the focal length is adjusted. Adjusting the focal length alters the field of view and the perceived distance between objects, which impacts the working distance and alignment of the images. These changes can result in parallax errors, where the relative positions of objects in the two images appear inconsistent, thereby compromising depth perception and the overall quality of the stereoscopic effect.

Currently, one solution for addressing image alignment in stereoscopic imaging systems, particularly for parallel stereo cameras, is Horizontal Image Translation (HIT). This technique involves shifting images horizontally based on the working distance between the cameras and the subject. By making these adjustments, HIT ensures proper alignment and accurate depth perception in the final stereoscopic output.

However, the HIT technique is primarily effective for parallel stereo camera setups. In systems where cameras are converged (i.e., their optical axis converges/intersect at a point), horizontal image shifts alone are inadequate. Converged camera setups introduce complex parallax and alignment challenges that HIT cannot sufficiently address, resulting in inaccuracies in the stereoscopic output.

Therefore, there is a need to find an alternative method to overcome the aforementioned problems.

SUMMARY OF THE INVENTION

The present invention pertains to the field of stereoscopic imaging and visualization technology. Traditional stereo camera setups often face challenges when the focal length of the camera changes, as this can affect the alignment of the images, leading to issues with parallax and depth perception.

The present invention involves the creation and manipulation of stereoscopic (3D) vision using converged stereo cameras equipped with optical zoom lenses. The present invention addresses the above problem in the converged camera setups by dynamically shifting the images based on the convergence point of the cameras. The present invention ensures that the images are shifted in a way that creates zero parallax at the viewer's perspective, significantly enhancing the stereoscopic vision experience.

According to the first aspect of the present disclosure, a camera system for creating stereoscopic (3D) vision, comprising a first image sensor with an adjustable focal length configured to capture a first image of the object from a first perspective and a second image sensor with an adjustable focal length configured to capture a second image of the object from a second perspective. The first image sensor and the second image sensor are located in the same plane and separated by a distance known as baseline. The first image sensor and the second image sensor are angled inward toward each other to focus on the object and the optical axes of the first image sensor and the second image sensor intersect at a convergence point.

The present invention further comprises a processor communicatively connected to the first and second image sensors. The processor processes the first image and the second image from the first and second image sensors to ensure accurate depth perception. The processor is configured to (i) receive the first image and the second image captured by the first image sensor and second image sensor; (ii) dynamically calculate a distance between the object and the image sensors in which the distance dynamically changes according to the adjustment of the focal length; (iii) dynamically shift the position of one of the images relative to the other image based on the position of the object with respect to the convergence point. The shifting of the images compensates for the adjustment in the working distance caused by adjustment of the focal length; and (iv) crop a fixed Region of Interest (ROI) from the shifted images and creates a stereoscopic (3D) vision based on the cropped ROI independent of adjustments to the focal length.

In some aspects, the first image sensor is configured to capture an image of the left side of the object, and the second image sensor is configured to capture the image of the right side of the object.

In some aspects, dynamically shifting the position of the images comprises shifting the left image towards the left side of a horizontal plane and the right image towards the right side of the horizontal plane, when the object is positioned before the convergence point to create zero parallax effect.

In some aspects, dynamically shifting the position of the images comprises shifting the left image towards the right side of the horizontal plane and the right image towards the left side of the horizontal plane, when the object is positioned beyond the convergence point to create zero parallax effect.

In some aspects, the shifting is prevented when the object is positioned at the convergence point.

In some aspects, the focal length of the first image sensor and the second image sensor is adjusted by altering the position of the lens in the first image sensor and the second image sensor.

According to a second aspect of the present disclosure, a method for creating stereoscopic (3D) vision using a camera system is disclosed. The method comprises, capturing a first image of an object from a first perspective using a first image sensor and capturing a second image of the object from a second perspective using a second image sensor. The first image sensor and the second image sensor are located in the same plane and separated by a distance known as baseline. The first image sensor and the second image sensor are angled inward toward each other to focus on the object and the optical axes of the first image sensor and the second image sensor intersect at a convergence point. The method further comprising, (i) receiving the captured first image and the second image by the processor; (ii) dynamically calculating, by a processor, a distance between the object and the image sensors, the distance dynamically changes according to the adjustment of the focal length; (iii) dynamically shifting the position of one of the images relative to the other image based on the position of the object with respect to the convergence point, to compensate for the changes in the working distance caused by adjustment of the focal length; and (iv) cropping a fixed Region of Interest (ROI) from the shifted images and create a stereoscopic (3D) vision based on the cropped ROI independent of adjustments to the focal length.

According to a third aspect of the present disclosure, a computer program product comprising a non-transitory computer readable medium, having thereon a computer program comprising program instructions, the computer program is loadable into a data processing unit and is configured to cause execution of the method steps when the computer program is run by the data processing unit.

The system for creating stereoscopic (3D) vision and the associated method, according to the present invention, offer the following advantages:

The present invention dynamically shifts the captured images based on the object's position relative to the convergence point, ensuring that the 3D visualization is always free of parallax distortion. This results in a highly immersive and accurate stereoscopic experience for the viewer.

Further, by maintaining zero parallax at the convergence point, the system ensures that the depth perception in the 3D visualization is realistic and accurate, reducing viewer fatigue and improving usability in applications like virtual reality, augmented reality, and 3D displays.

The method dynamically recalculates the object's distance and shifts the images based on adjustment in the focal length, enabling seamless zooming without compromising the 3D effect or image alignment.

Further, cropping a fixed Region of Interest (ROI) from the dynamically shifted images ensures that the final 3D visualization remains consistent, regardless of the zoom level or focal length adjustments. This eliminates issues like framing discrepancies or misalignment of objects.

The present invention eliminates excessive parallax that could cause discomfort, nausea, or eye strain for users during prolonged viewing. This makes it particularly suitable for consumer-facing applications like 3D televisions, gaming, and virtual reality. By dynamically shifting and aligning the images during capture, the invention reduces the post-processing workload needed for 3D rendering. This saves time and computational resources, enabling real-time 3D visualization.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF ACCOMPANYING DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION OF THE PREFERRED EMBODIMENT

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
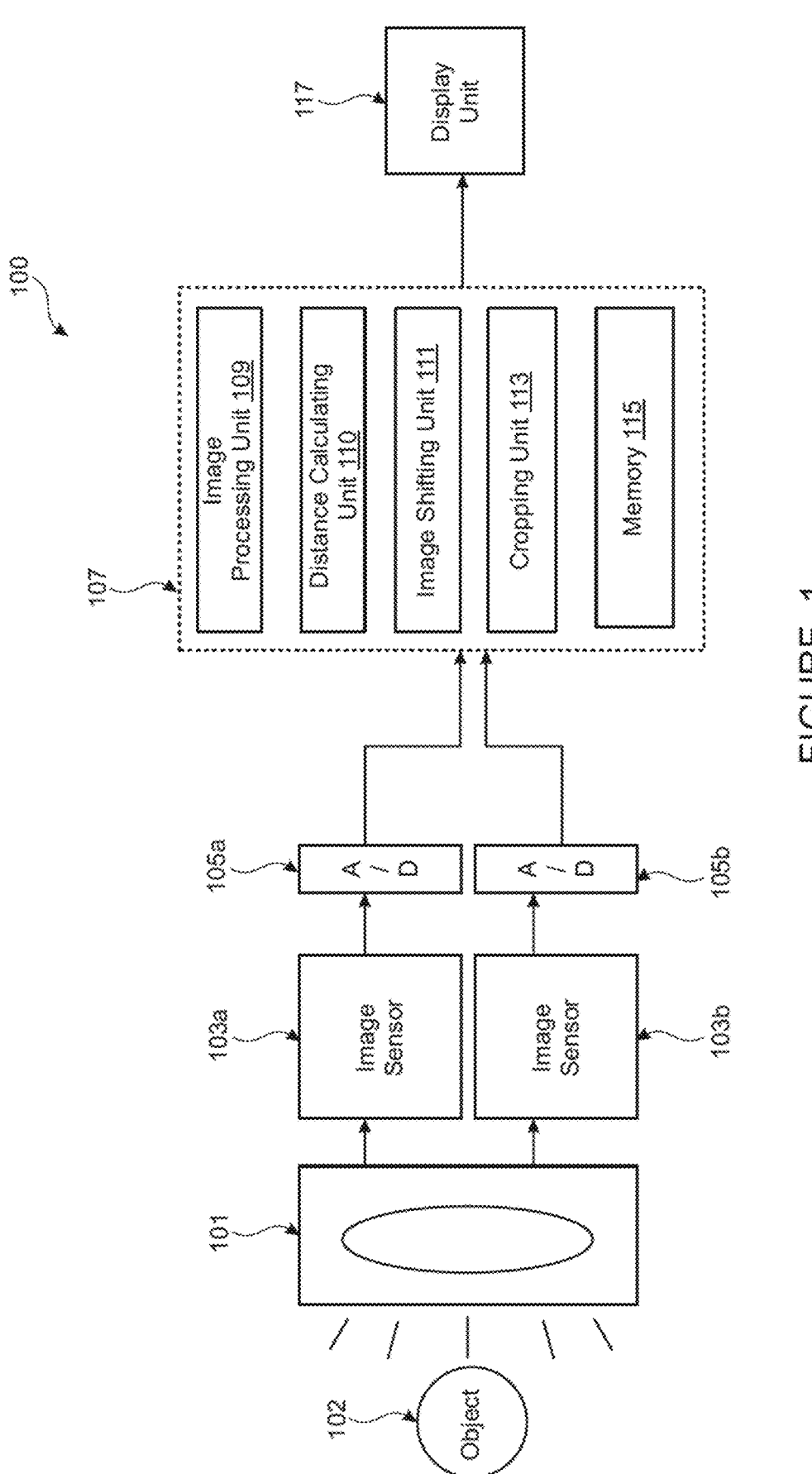
FIG. 1 illustrates a block diagram of a camera system for creating stereoscopic (3D) vision, according to an embodiment of the invention.

FIG. 1 illustrates a block diagram of a camera system 100 for creating stereoscopic (3D) vision, in accordance with an embodiment of the invention. As depicted in FIG. 1, the camera system 100 comprises two image sensors, 103a and 103b, configured to capture visual data and generate stereoscopic (3D) vision. The image sensors 103a and 103b are imaging devices capable of sensing and capturing visual representations of an object 102. Specifically, the first image sensor 103a captures the image of the object 102 from a first perspective, while the second image sensor 103b captures the image of the same object 102 from a second perspective.

Figure 2:
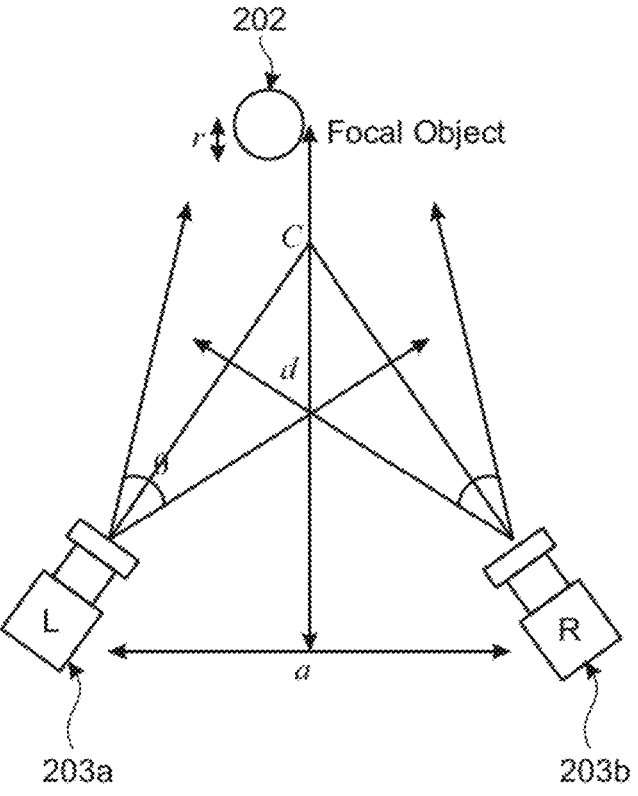
FIG. 2 illustrates how the image sensors are placed inside the camera system according to an embodiment of the invention.

The spatial arrangement of the first image sensor 103a and the second image sensor 103b within the camera system 100 is further illustrated in FIG. 2. The first image sensor 103a captures the left-side view of the object 102, whereas the second image sensor 103b captures the right-side view of the object 102. In this embodiment, the first image sensor 103a is also referred to as the left image sensor, and the second image sensor 103b is referred to as the right image sensor.

The camera system 100 further includes a focus lens 101 configured to adjust the focal length of the camera system 100. The focal length of the first image sensor and the second image sensor is adjusted by adjusting the position of the lens 101. Adjusting the focal length is critical for enabling zoom functionality, allowing the camera system 100 to zoom in or out on the object 102. Additionally, the adjustment of the focal length modifies the field of view of the camera system 100. Specifically, a longer focal length narrows the field of view, resulting in a magnified and detailed view of the object 102, while a shorter focal length broadens the field of view, capturing a wider area of the scene along with the object 102. The captured images are subsequently converted into electrical signals by the image sensors 103*a* and 103*b*.

As illustrated in FIG. 1, the camera system 100 further comprises Analog-to-Digital (A/D) converters 105*a* and 105*b*, configured to convert the analog signals received from the image sensors 103*a* and 103*b* into digital signals. The A/D converters 105*a* and 105*b* are electrically connected to the image sensors 103*a* and 103*b*, respectively, and perform the conversion of received analog image signals into digital signals.

Specifically, the A/D converter 105*a* receives the analog image signal captured by the image sensor 103*a*, representing the left-side view of the object 102, and converts it into a corresponding digital signal. Similarly, the A/D converter 105*b* receives the analog image signal captured by the image sensor 103*b*, representing the right-side view of the object 102, and converts it into a digital signal. The converted digital signals are then transmitted by the A/D converters 105*a* and 105*b* to a processor 107 for further processing.

The processor 107 is communicatively coupled to the A/D converters 105*a* and 105*b* and comprises an image processing unit 109, a distance calculating unit 110, an image shifting unit 111, and a cropping unit 113. The processor 107 is configured to process the digital signals—specifically, the left-side image and the right-side image of the object 102—received from the A/D converters 105*a* and 105*b*.

A memory 115, connected to the processor 107, serves as a repository for storing data processed by the various units of the processor 107, including the image processing unit 109, the distance calculating unit 110, the image shifting unit 111, and the cropping unit 113. The memory 115 may include any computer-readable medium or computer program product known in the art including, for example, volatile memory, such as Static Random-Access Memory, SRAM, and Dynamic Random-Access Memory, DRAM, and/or non-volatile memory, such as Read Only Memory, ROM, Erasable Programmable ROM, EPROM, Electrically Erasable and Programmable ROM, EEPROM, flash memories, hard disks, optical disks, and magnetic tapes.

The image processing unit 109 of the processor 107 performs various image processing tasks, such as pixel interpolation and color conversion, on the digital signals received from the A/D converters 105*a* and 105*b*. The processed digital signals are output as the left image and the right image of the object 102. In one embodiment, the processed left and right image are stored in the memory 115 for further use.

The distance calculating unit 110 calculates the distance between the focus lens 101 and the object 102, referred to as the working distance. This working distance dynamically changes when the focus lens 101 is adjusted to zoom in or out on object 102. As the focus lens 101 is zoomed in or out, the distance calculating unit 110 dynamically recalculates the working distance accordingly. In one embodiment, the calculated working distance is stored in memory 115 for subsequent processing or reference.

The image shifting unit 111 receives the processed left and right images from the image processing unit 109 and dynamically shifts the position of one image relative to the other. This ensures the images are aligned to achieve a zero-parallax effect. For creating 3D effects, it is essential to determine where the zero parallax occurs, as this determines whether objects appear in front of, behind, or at the depth of the display. The zero-parallax effect refers to a condition where the left and right images are perfectly aligned at a specific depth or focal point, allowing the viewer to perceive object 102 as being at the same depth as the display surface.

To shift the left image and the right image, the image shifting unit 111 calculates the number of pixels by which the left and the right image need to be shifted. This calculation is performed using the following expression:

$$\text{Pixel shift} = p\left(\frac{a}{2\tan\left(\frac{\theta}{2}\right)(d-r)}\right)$$

Where:
- p: Horizontal resolution of the display (e.g., the total number of horizontal pixels on the screen)
- a: 2*Interaxial distance between the two cameras (distance between the left and right cameras)
- $\theta$: Angle of view of the camera
- d: Depth from the cameras to the focal point
- r: Radius of the object The above expression calculates the precise number of pixels (p) by which the images captured by the image sensors 103*a* and 103*b* must be horizontally shifted. This horizontal shift ensures that the parallax aligns with the viewer's depth perception, thereby creating an accurate and comfortable 3D visual effect.

The image shifting unit 111 performs the horizontal image shifting to compensate for changes in the working distance caused by adjustments to the focal length. Adjusting the focal length alters the field of view and the convergence point of the camera system 100, which directly impacts the alignment of the images in a stereo setup. For instance, when the focus lens 101 is zoomed in or out to focus on an object 102, the perspectives captured by the first and second image sensors 103*a* and 103*b* shift accordingly. This change in perspectives can misalign the left and right images, leading to incorrect parallax and rendering the 3D effect uncomfortable or visually inaccurate.

The image shifting unit 111 detects adjustments to the focal length (e.g., zooming in or out) and the corresponding changes in the working distance. It dynamically calculates the extent to which the alignment of the left and right images will change. In certain embodiments, the image shifting unit 111 receives the working distance from the distance calculating unit 110 and calculates the precise horizontal shift required to maintain the alignment of the object 102. Using the previously mentioned expression, the image shifting unit 111 ensures that the left and right images remain aligned to achieve the zero-parallax effect.

Additionally, in some embodiments, the image shifting unit 111 dynamically determines the convergence point of the camera system 100 based on adjustments to the focal length and working distance. The convergence point refers to the point where the optical axes of the first and second image sensors 103*a* and 103*b* intersect. The image shifting unit 111 identifies the position of the object 102 relative to the convergence point and adjusts the alignment of the left and right images accordingly to achieve the zero-parallax effect.

For example:
If the object 102 is located at the convergence point, no image shifting is required, as the zero-parallax effect is inherently achieved.

If the object 102 is located before the convergence point, the image shifting unit 111 shifts the left image towards the left and the right image towards the right to ensure proper alignment.

Conversely, if the object 102 is located beyond the convergence point, the image shifting unit 111 shifts the left image towards the right and the right image towards the left to maintain correct depth perception.

These adjustments are critical for maintaining accurate depth perception, ensuring a seamless 3D effect, and avoiding viewer discomfort.

After the image has been shifted using the image shifting unit 111, the cropping unit 113 identifies a fixed Region of Interest (ROI) within the shifted images and crops a ROI from the shifted image. The cropped ROI is centered and adjusted based on the image shift, ensuring that it aligns with the desired portion of the scene. This ROI is then used for creating stereovision and displayed in display unit 117, providing the user with a consistent and accurate stereoscopic view. The cropping process ensures that the displayed image is of the correct size and position, maintaining the intended stereoscopic effect.

FIG. 2 illustrates the arrangement of the image sensors 203a and 203b within the camera system 100 according to an embodiment of the invention. The first image sensor 203a and the second image sensor 203b are positioned on the same plane and angled inward toward each other to focus on object 202. These image sensors 203a and 203b are separated by a distance denoted as "a", referred to as the baseline. Additionally, the optical axes of the first image sensor 203a and the second image sensor 203b intersect at a point "C", known as the convergence point. The angle of view of the camera is represented by "θ" and the depth from the camera lens to the object is represented as "d".

In this embodiment, the first image sensor 203a captures the left-side view of the object 202 (indicated as Focal object in the image), while the second image sensor 203b captures the right-side view of the object 202. The captured left image and right image are subsequently combined to create a 3D effect when displayed through an appropriate display system. This effect mimics the way human eyes perceive depth, thereby enhancing the viewer's depth perception.

Figure 3A:
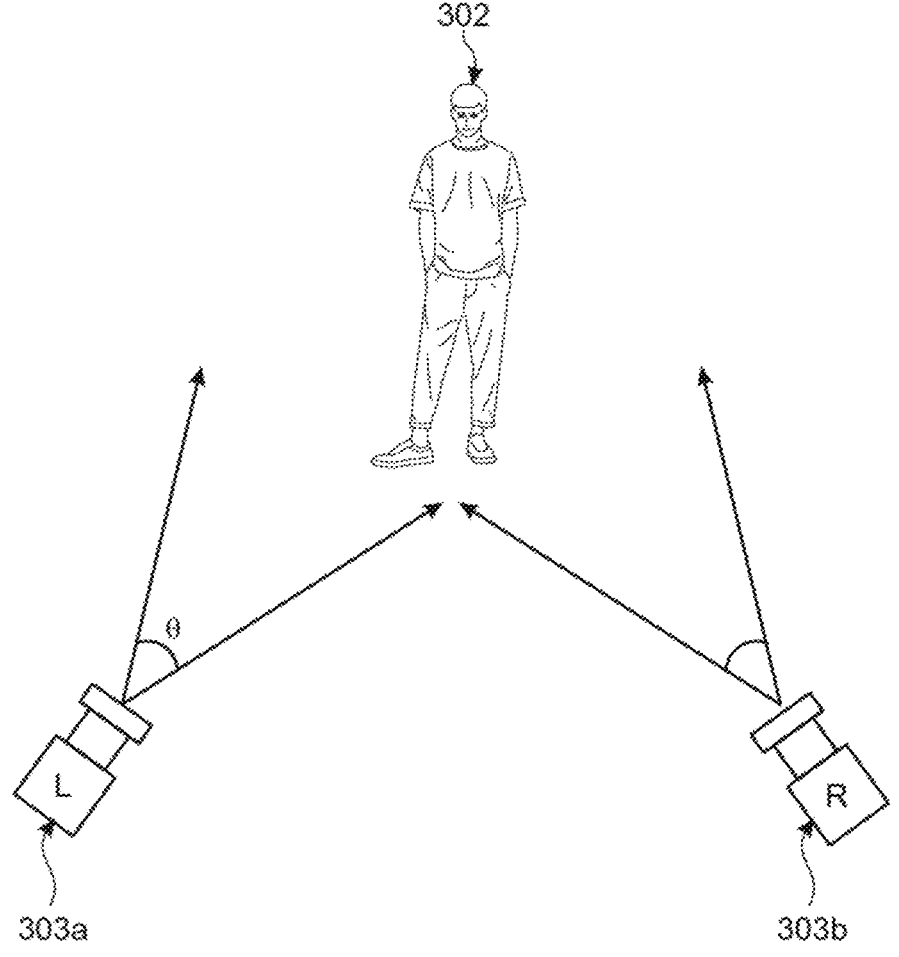
FIG. 3A illustrates exemplary implementation of the invention with the calculation principles on the shifting of the images, according to an embodiment of the invention.

FIG. 3A illustrates exemplary implementation of the invention with the calculation principles on the shifting of the images, according to the embodiment of the invention. Imagine a stereo camera system 100 being used to capture 3D footage of a person 302 standing 5 meters away. The camera system comprises two image sensors 303a and 303b and the camera system 100 is initially set to a wide-angle focal length to capture the full scene, including the background. The image sensor 303a can be referred to as left image sensor and captures the left perspective of the person 302 in the scene and similarly, the image sensor 303b is referred as right image sensor and captures the right perspective of the person 302 in the scene. During filming, the operator zooms in to focus on the person's face, changing the focal length of the image sensors 303a and 303b.

Figure 3B:
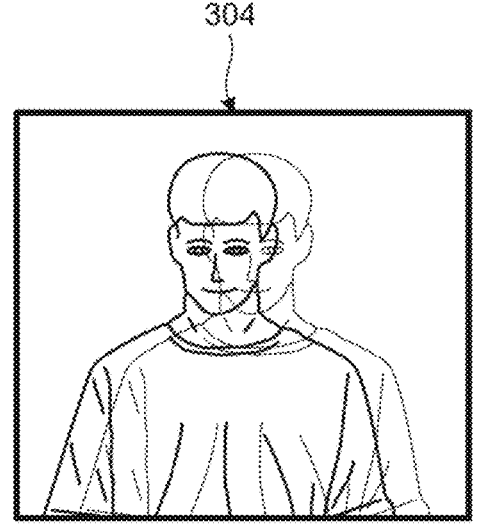
FIG. 3B illustrates an exemplary stereoscopic image that is processed before and after the shifting process according to an embodiment of the invention.
Figure 3B:
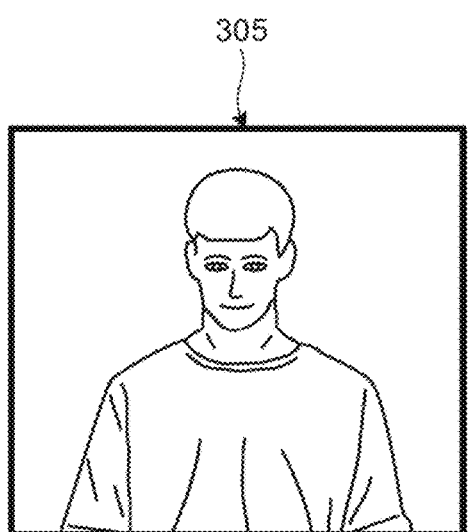

As the focal length increases, the left and right image sensors 303a and 303b perspective slightly shift due to the optical zoom. This causes misalignment between the left and right images of the person 302 captured by the left and right image sensors 303a and 303b. Image 304 in FIG. 3B illustrates this misalignment. The person's face 302 no longer appears perfectly aligned at the convergence point. This misalignment introduces incorrect parallax, making the 3D effect uncomfortable or distorted.

The camera system (100), according to the embodiment of the invention, calculates the required image shift using the parallax shift equation:

$$\text{Pixel shift} = p \left( \frac{a}{2\tan\left(\frac{\theta}{2}\right)(d-r)} \right)$$

where:
  p: Horizontal resolution of the display (e.g., the total number of horizontal pixels on the screen)
  a: 2*Interaxial distance between the cameras
  θ: Angle of view of the camera
  d: Depth from the camera to the focal point
  r: Radius of the object
In the above equation, the angle of view (θ) can be determined using the following equation:

$$\theta = 2 \times \arctan\left(\frac{d}{2f}\right)$$

Where f is the focal length of the camera

Example Calculation

Let us assume that the distance between the two image sensors (303a and 303b) is 6 mm (0.006 m). The angle of view of the camera is 0.55 radians, and the depth from the cameras to the focal point is 100 cm. The number of pixels by which the images need to be shifted to maintain zero parallax can be derived as follows.
Given Values:
  a=2×0.06=0.12 m
  θ=0.55 radians
  d=1m
  r=Radius of the object, here it is negligible.
Calculation Steps:
Step 1: Calculate Tan(θ/2)

$$\tan\left(\frac{0.55}{2}\right) = \tan(0.275) = 0.282$$

Step 2: Substitute Values into the equation $$\left( \frac{a}{2\tan\left(\frac{\theta}{2}\right)(d-r)} \right)$$

$$\frac{a}{2\tan\left(\frac{\theta}{2}\right)(d-r)} = \frac{0.12}{2 \times 0.282 \times 1} = 0.213 \text{ (meters per pixel)}$$

Step 3: Perform the Calculation
If the horizontal resolution (H) of the display is, let's say, 1920 pixels, and the screen width is 0.5 meters, the pixel shift can be computed using the below equation:

$$\text{Pixel shift in pixels} = \frac{H}{0.5} \times \left( \frac{a}{2\tan\left(\frac{\theta}{2}\right)(d-r)} \right)$$

US 12,634,421 B1

9

-continued $$\text{Pixel shift in pixels} = \frac{1920}{0.5} \times 0.213$$

$$\text{Pixel shift in pixels} = 818 \text{ pixels}$$

Therefore, the left image of the person 302 captured by the image sensor 303*a* should be shifted 818 pixels to the right, and the right image of the person 302 captured by the image sensor 303*b* should be shifted 818 pixels to the left to maintain zero parallax at the adjusted depth. FIG. 3B illustrates an exemplary stereoscopic image 305 that is processed after the shifting process according to the embodiment of the invention.

Figure 4:
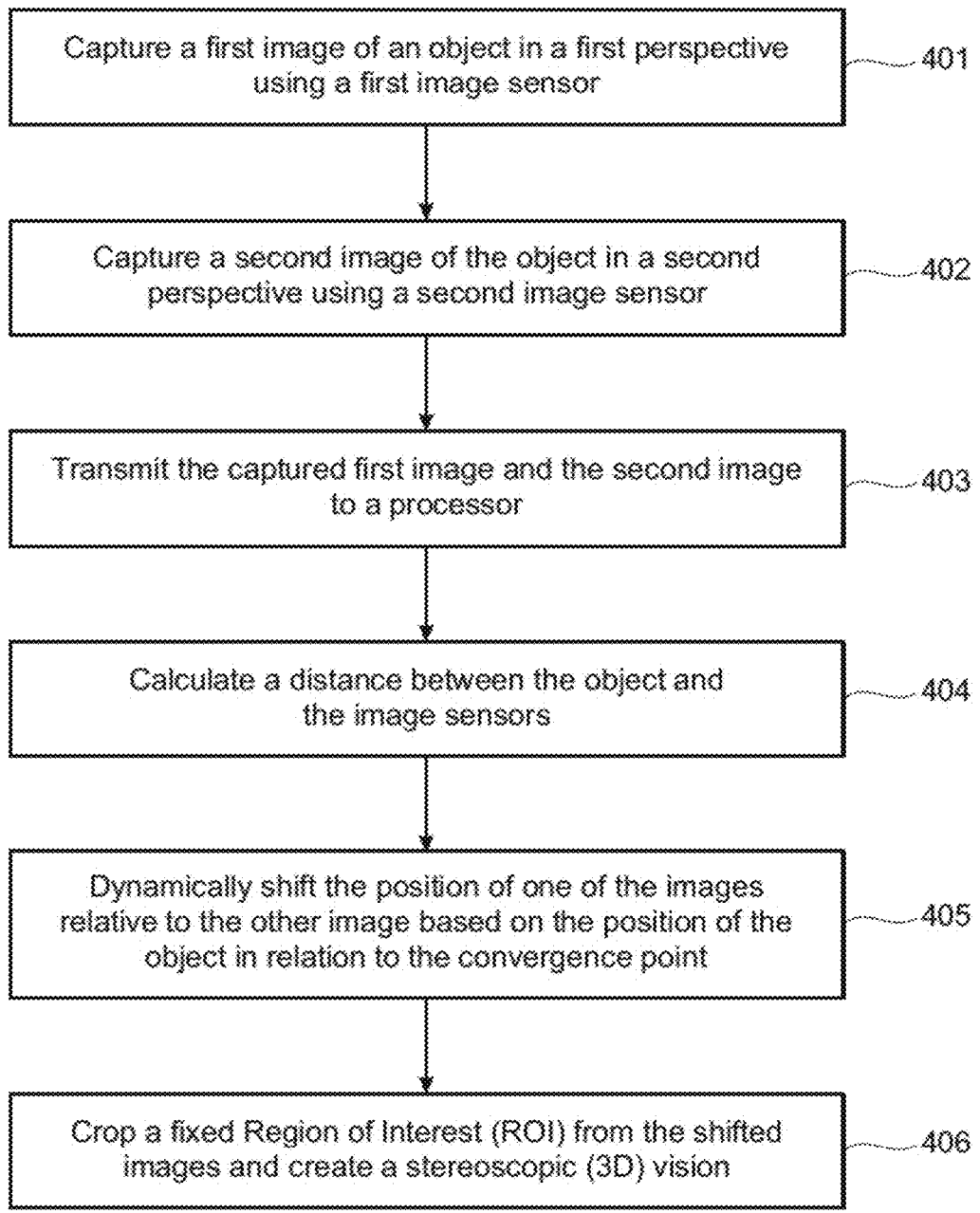
FIG. 4 illustrates a flowchart of a method for creating stereoscopic (3D) vision, according to an embodiment of the invention.

FIG. 4 illustrates a flowchart of a method for creating stereoscopic (3D) vision, according to the embodiment of the invention. The method involves capturing images from two perspectives, dynamically adjusting the images to account for focal length variations and creating a 3D visualization with zero parallax at the convergence point. The method is described in detail below:

At step 401, a first image sensor 103*a* captures a left-perspective image of an object 102, referred to as the left image. At step 402, a second image sensor 103*b* captures a right-perspective image of the object 102, known as the right image. Both image sensors (103*a* and 103*b*) are positioned on the same plane and are separated by a distance known as the baseline (interaxial distance). In this embodiment, 103*a* is designated as the left image sensor, while 103*b* serves as the right image sensor. The sensors 103*a* and 103*b* are angled inward so that their optical axes intersect at a convergence point C, ensuring focus on object 102.

At step 403, the captured left and right images are transmitted to a processor 107 for further processing. The processor 107 receives these images as input data for dynamic adjustment and alignment. In one embodiment, processor 107 performs various image processing tasks, such as pixel interpolation and color conversion, on the left and right images obtained from the image sensors 103*a* and 103*b*.

At step 404, the processor 107 dynamically calculates the distance between the focus lens 101 and the object 102, referred to as the working distance. This working distance changes dynamically according to adjustments of the focus lens 101 for zooming in and out on object 102. As the focal length is adjusted, either by zooming in or out, the distance between object 102 and the sensors 103*a* and 103*b* changes. This distance information is essential for aligning images to achieve a zero-parallax effect.

At step 405, based on the calculated distance and the position of the object relative to the convergence point, the processor 107 dynamically shifts the position of one of the images relative to the other. This shifting compensates for the adjustment in the working distance caused by the change in focal length. This dynamic shifting ensures that the parallax effect is corrected, maintaining accurate depth perception and enhancing the 3D experience regardless of the object's position.

In order to shift the left image and the right image, the processor (107) determines the number of pixels that each image must be shifted. The number of pixels that each image has to be shifted can be determined using the following expression.

$$\text{Pixel shift} = p\left(\frac{a}{2\tan\left(\frac{\theta}{2}\right)(d-r)}\right)$$

10

The above expression determines the precise number of pixels by which the images captured by the image sensors 103*a* and 103*b* must be horizontally shifted. This shift ensures that the parallax aligns with the viewer's depth perception, creating a proper 3D image.

At step 406, the processor 107 identifies a fixed Region of Interest (ROI) within the adjusted images. The ROI is cropped from both the left and right images to ensure consistent framing of the object 102, independent of focal length adjustments. This cropping process guarantees that the displayed image maintains the correct size and position, preserving the intended stereoscopic effect. The ROI forms the basis of the stereoscopic 3D vision, ensuring that the final output is well-aligned and free of parallax distortion.

Figure 5:
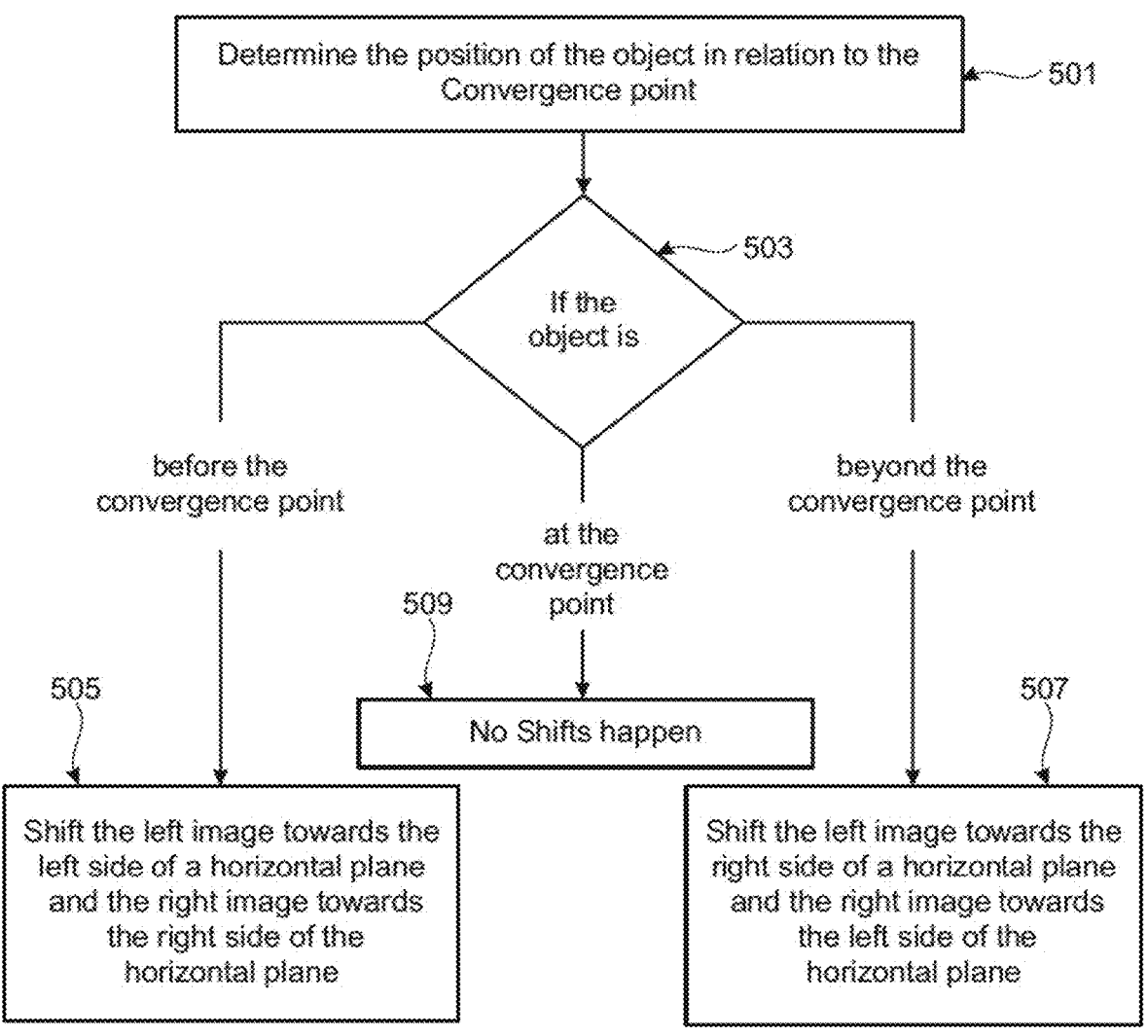
FIG. 5 illustrates a flowchart of a method for dynamically shifting the position of one of the images relative to the other image, according to an embodiment of the invention.

FIG. 5 illustrates a flowchart of a method for dynamically shifting the position of one image relative to the other, according to the embodiment of the invention. At step 501, processor 107 determines the position of object 102 in reference to the convergence point and shifts the left and right images to align them for a zero-parallax effect. At step 503, the processor assesses whether object 102 is located 1) at the convergence point, 2) before the convergence point, or 3) after the convergence point.

Case 1: Objects Before the Convergence Point

At step 505, the processor 107 shifts the left image towards the left side of a horizontal plane and the right image towards the right side of the horizontal plane, if the object is before the convergence point.

Case 2: Objects Beyond the Converging Point

At step 507, processor 107 shifts the left image towards the right side of a horizontal plane and the right image towards the left side of the horizontal plane, if the object is beyond the convergence point. This adjustment is necessary to maintain correct depth perception and avoid visual discomfort.

Case 3: Objects at the Convergence Point

At step 509, processor 107 does not shift the images if the object is at the convergence point, since zero parallax is inherently achieved. That is at the convergence point the left image and the right image perfectly aligns with each other.

In another embodiment, a computer program product comprising a non-transitory computer readable medium, having thereon a computer program comprising program instructions, the computer program is loadable into a data processing unit and is configured to cause execution of the method steps 401 to 406 when the computer program is run by the data processing unit.

The present invention can be applied in various fields where high-quality 3D imaging is essential:

1. Medical Imaging:

In medical imaging technologies, such as endoscopy and surgical navigation systems, depth perception is important for precision. Improving the accuracy and effectiveness of medical procedures through enhanced 3D visualization.

2. Surveillance and Security:

In surveillance systems that require detailed stereoscopic imaging for better analysis and identification. The present invention provides more accurate and reliable 3D data for security applications.

3. Industrial Inspection:

In industrial inspection systems, 3D imaging can be used to detect defects and measure components with high precision. The present invention enhances quality control processes in manufacturing industries.

Although the present invention has been described in considerable detail with reference to certain preferred embodiments and examples thereof, other embodiments and equivalents are possible. Even though numerous characteristics and advantages of the present invention have been set forth in the foregoing description, together with functional and procedural details, the disclosure is illustrative only, and changes may be made in detail, especially in terms of the procedural steps within the principles of the invention to the full extent indicated by the broad general meaning of the terms. Thus, various modifications are possible of the presently disclosed system and process without deviating from the intended scope of the present invention.

What is claimed is:

1. A camera system for creating stereoscopic (3D) vision, wherein the camera system comprises:
    a first image sensor with an adjustable focal length configured to capture a first image of an object from a first perspective;
    a second image sensor with an adjustable focal length configured to capture a second image of the object from a second perspective;
    wherein:
        the first image sensor and the second image sensor are located in the same plane and separated by a baseline;
        the first image sensor and the second image sensor are angled inward toward each other to focus on the object; and
        the optical axes of the first image sensor and the second image sensor intersect at a convergence point;
    a processor communicatively connected to the first and second image sensors, wherein the processor is configured for:
        receiving the first image and the second image captured by the first image sensor and second image sensor;
        processing the first image and the second image from the first and second image sensors to ensure accurate depth perception by:
        determining a change in the focal length while focusing on the object;
        in response to determination, dynamically calculating working distance between the object and a focus lens, wherein the working distance dynamically changes according to the change in the focal length;
        determining position of the object with respect to the convergence point;
        dynamically shifting position of one of the images relative to the other image based on the position of the object with respect to the convergence point, to compensate for changes in the working distance caused by adjustment of the focal length thereby achieving zero parallax effect; and
        cropping a fixed Region of Interest (ROI) from the shifted images to create a stereoscopic (3D) vision.

2. The system as claimed in claim 1, wherein the first image sensor configured to capture an image of the left side of the object, and the second image sensor configured to capture the image of the right side of the object.

3. The system as claimed in claim 1, wherein dynamically shifting the position of the images comprises:
    shifting the left image towards the left side of a horizontal plane and the right image towards the right side of the horizontal plane, when the object is positioned before the convergence point, to create zero parallax effect.

4. The system as claimed in claim 1, wherein dynamically shifting the position of the images comprises:
    shifting the left image towards the right side of the horizontal plane and the right image towards the left side of the horizontal plane, when the object is positioned beyond the convergence point, to create zero parallax effect.

5. The system as claimed in claim 1, wherein the shifting is prevented when the object is positioned at the convergence point.

6. The system as claimed in claim 1, wherein the focal length of the first image sensor and the second image sensor is adjusted by altering the position of the lens in the first image sensor and the second image sensor.

7. A method for creating stereoscopic (3D) vision using a camera system, wherein the method comprises:
    capturing a first image of an object from a first perspective using a first image sensor;
    capturing a second image of the object from a second perspective using a second image sensor,
    wherein
        the first image sensor and the second image sensor are located in the same plane and separated by a baseline;
        the first image sensor and the second image sensor are angled inward toward each other to focus on the object; and
        the optical axes of the first image sensor and the second image sensor intersect at a convergence point;
    receiving the captured first image and the second image by the processor;
    processing the first image and the second image from the first and second image sensors to ensure accurate depth perception by
    determining a change in the focal length while focusing on the object;
    in response to the determination, dynamically calculating, by a processor, working distance between the object and a focus lens, wherein the working distance dynamically changes according to the change in the focal length;
    determining position of the object with respect to the convergence point;
    dynamically shifting position of one of the images relative to the other image based on the position of the object with respect to the convergence point to compensate for changes in the working distance caused by adjustment of the focal length thereby achieving zero parallax effect; and
    cropping a fixed Region of Interest (ROI) from the shifted images to create a stereoscopic (3D) vision.

8. The method as claimed in claim 7, wherein the first image sensor configured to capture an image of the left side of the object, and the second image sensor configured to capture the image of the right side of the object.

9. The method as claimed in claim 7, wherein dynamically shifting the position of the images comprises:
    shifting the left image towards the left side of a horizontal plane and the right image towards the right side of the horizontal plane, when the object is positioned before the convergence point, to create zero parallax effect.

10. The method as claimed in claim 7, wherein dynamically shifting the position of the images comprises:
    shifting the left image towards the right side of the horizontal plane and the right image towards the left side of the horizontal plane, when the object is positioned beyond the convergence point to create zero parallax effect.

11. The method as claimed in claim 7, wherein the shifting is prevented, when the object is located at the convergence point.

12. The method as claimed in claim 7, wherein the focal length of the first image sensor and the second image sensor is adjusted by altering the position of the lens in the first and the second image sensors.

13. A computer program product comprising a non-transitory computer readable medium, having thereon a computer program comprising program instructions, the computer program is loadable into a data processing unit and configured to cause execution of the method according to claim 7 when the computer program is run by the data processing unit.

\* \* \* \* \*